United States Patent [19]
Oldham et al.

[11] 3,805,957
[45] Apr. 23, 1974

[54] FLOATING SOLIDS RETURN DEVICE

[75] Inventors: Robert R. Oldham; John H. Wooddell, both of Sidney, Ohio

[73] Assignee: Robert R. Oldham, Inc., Sidney, Ohio

[22] Filed: Mar. 31, 1972

[21] Appl. No.: 239,887

[52] U.S. Cl..................... 210/98, 210/136, 210/195, 210/220
[51] Int. Cl............................................. B01d 21/24
[58] Field of Search ............. 210/97, 136, 195, 220, 210/221, 98

[56] References Cited
UNITED STATES PATENTS
3,195,727  7/1965  Kibbee................................ 210/195
3,244,285  4/1966  Allen ............................... 210/220 X Primary Examiner—John Adee
Assistant Examiner—Robert H. Spitzer
Attorney, Agent, or Firm—Cain and Lobo

[57] ABSTRACT

A sewage treatment system in which liquid sewage containing solids is conducted into first or primary settling tank. Liquid is drawn from an intermediate depth of the first tank and conducted to a reducing tank containing means for inducing air (aerator) into the fluid. A final or outflow settling tank adjacent the reducing tank includes a wall in common with the reducing tank under which settled solids are conducted from the outflow tank to the reducing tank. A floating solids return is also provided between the outflow and reducing tanks, and includes a provision for closing off the fluid flow path from the reducing tank to the output tank when the aerator is not operating to prevent the surface fluid of the reducing tank from flowing into the outflow settling tank. The effluent is drawn from an intermediate depth of the outflow settling tank.

12 Claims, 2 Drawing Figures

PATENTED APR 23 1974 3,805,957

FLOATING SOLIDS RETURN DEVICE

BACKGROUND OF THE INVENTION

1. Field of the Invention

This invention relates to improvements in sewage treatment systems, and, more particularly, to improvements in sewage treatment systems of the type in which a clear effluent is obtained from sewage reducing and settling tanks.

2. Description of the Prior Art

In locations not served by municipal sewage systems, septic tanks, settling systems and other small scale sewage treatment systems are widely used. Separte sewage treatment systems for use, for example, for a house, small apartment complex, or the like, are becoming increasingly popular. Such systems commonly comprise a first settling tank for separating the solid matter from the sewage, a second tank wherein the sewage, both liquid and solid, is exposed to oxygen and decomposed by aerobic action, and a third tank for final separation by settling. Clear effluent flows from the third tank and the settlings are returned by gravity to the second tank. Such systems usually include aeration means such as a diffuser, in the reducing tank to introduce air into the tank to hasten the aerobic reduction of the sewage and to establish circulation of the fluid in the reducing tank.

It has been found, however, that the sewage in the final settling tank ordinarily separates into two solid components, one of which settles to the bottom of the tank and one of which is of light weight and floats on the surface of the liquid. Ordinarily, in systems such as described above, a return is provided at the bottom of the final settling tank, such as a sloping wall, or the like, to direct the settled solids back to the bottom of the reducing tank. Additionally, returns have been provided or suggested between the surfaces of the fluids in the settling and reducing tanks to facilitate return of the floating solids from the final settling tank to the reducing tank. Such floating solid returns have included means by which the circulating water or fluid in the reducing tank could aid in returning the floating solids from the final settling tank.

One way of doing this is shown in U.S. Pat. No. 3,195,727 issued July 20, 1965 to Kibbee. The structure includes a straight eductor pipe or tube extending between and opening into both the reducing and settling tank at the level of surface of the liquid therein. A deflector, or the like, is supported on the pipe in the reducing tank to overlie, but be spaced from, the pipe opening. The deflector faces into the fluid flow path in the reducing tank and, since it covers but does not close the pipe, it creates a Bernoulli effect to draw fluid and entrapped floating solids through the pipe from the settling tank into the reducing tank.

One of the problems encountered in sewage treatment systems, such as proposed in U.S. Pat. No. 3,195,727, is that ordinarily the aeration devices employed in the systems are intended for noncontinuous operations. In fact, timing and other mechanisms are frequently employed to operate the aerating devices in response to the amount of sewage being treated on a predetermined schedule, or the like. During the periods in which the aeration device is not in operation there is little, if any, fluid circulation in the reducing tank. Accordingly, the abundant floating sewage in the reducing tank is free to flow into the settling tank, through the eduction pipe, since the deflector is spaced from and doesn't close the end of the eductor pipe or tube which is disposed within the reducing tank.

SUMMARY OF THE INVENTION

It is, therefore, a general object of this invention to provide a new and improved sewage treatment system for small and private installations.

It is another general object of the invention to provide a new and improved floating sewage return device to prevent floating sewage from flowing from a sewage reduction tank into a sewage settling and outflow tank.

It is a still further object of this invention to provide new and improved means for returning floating solids from a settling to a treatment or reducing tank, which is effective in returning the solids, but doesn't create flow rates of such capacity as to otherwise interfere with normal settling operations; which does not materially affect the usual quiescence in the settling tank; which positively prevents flow of floating solids from the treatment tank to the settling tank; which is economically manufactured and used; which is substantially foolproof in operation; which utilizes gravity and flow cycles otherwise existing in the treatment tank for operation of the floating solids return means; which does not require that the floating solids be displaced or cycled downwardly until after they are returned to the treatment tank; and which obtains one or more of the objects and advantages set forth herein.

These and other objects, features and advantages of this invention will become apparent to those skilled in the art from the following description of a preferred form thereof reference being had to accompanying drawing and appended claims.

BRIEF DESCRIPTION OF THE DRAWING

The invention is illustrated in the accompanying drawing, wherein.

In the Figures of the drawing, like reference numerals are used to denote like parts. Various ones of the parts have been exaggerated in size or dimension in the drawing for ease in description and clarity of illustration.

DESCRIPTION OF THE PREFERRED EMBODIMENTS

Briefly a sewage treatment system and floating solids return device embodying this invention includes an initial sewage settling tank from which the liquid or fluid flows from an intermediate depth into an adjacent reducing or treatment tank or chamber. A final or outflow settling tank is disposed adjacent the reducing tank and is provided with a sloping wall to return settled solid sewage through an opening in a common wall to the bottom of the reducing tank.

A floating solids return provides communication from the surface of the fluid in the final settling tank to the reducing tank. The floating solids return comprises a "J"shaped pipe or tube having a hinged cover over its opening in the reducing tank. Aerating means is also provided at the bottom of the reducing tank for introducing air into the reducing tank. The rising air establishes a fluid flow path or circulation in the tank. The tube opening in the reducing tank faces in the direction of fluid flow and thus the force of the current in the reducing tank opens the hinged cover which otherwise closes the opening into the floating solids return. The air also provides oxygen for aiding the sewage treatment process in the reducing tank.

Figure 1:
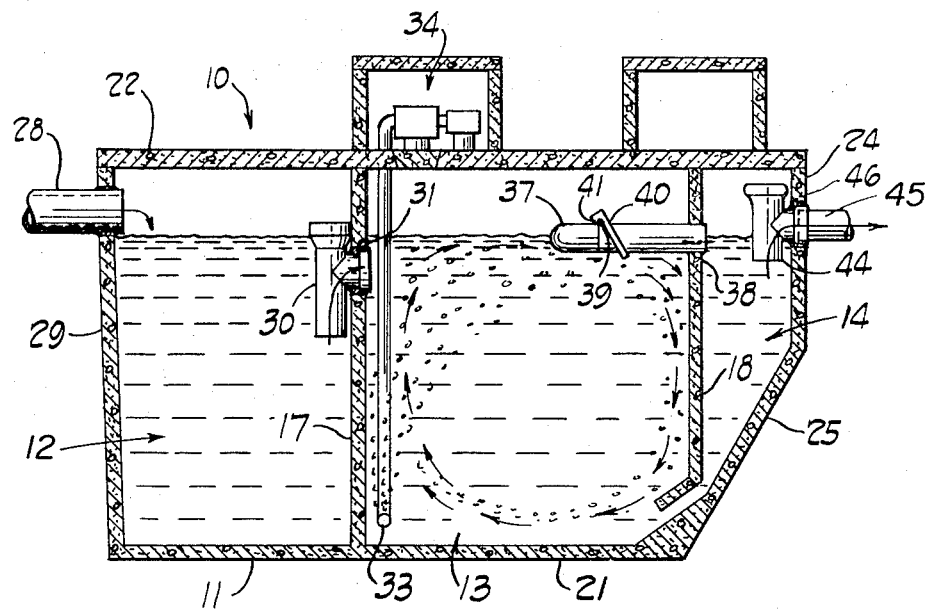
FIG. 1 is a vertical sectional view of a sewage treatment system including a floating solids return device, both of which embody this invention.
Figure 2:
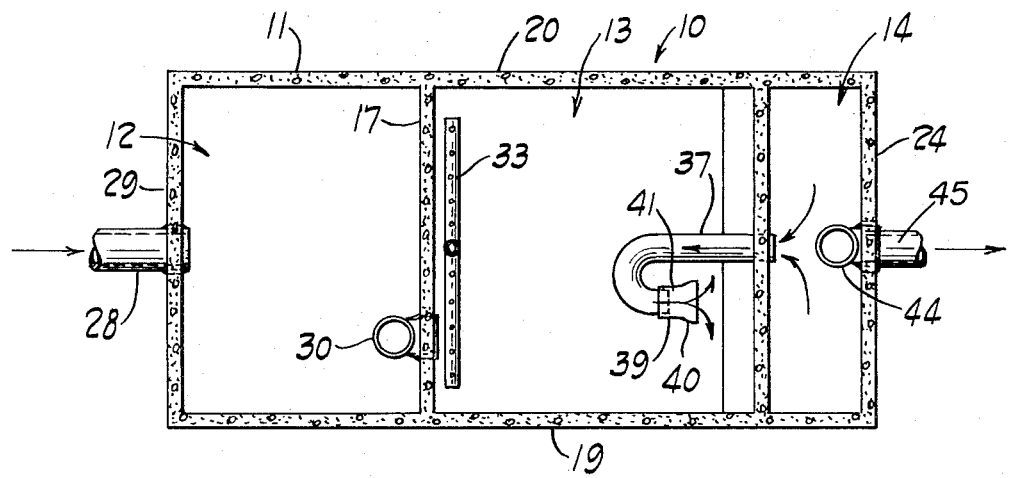
FIG. 2 is a top plan view of the sewage treatment system and device of FIG. 1 with the top or cover removed.

As shown in FIGS. 1 and 2 of the accompanying drawing, a sewage treatment system embodying this invention is indicated generally at 10 and includes an overall container 11 which is divided into three tanks, chambers or basins, a first, initial or input settling tank 12, a reducing or treatment tank 13, and a final or outflow settling tank 14. The input settling tank 12 and the reducing tank 13 are separated by a wall 17 extending to the bottom and sides of the overall container 11, and formed, conveniently, as a unitary part of the container 11. The reducing tank 13 and the final settling tank 14 are separated by a partition 18 extending to the vertical walls 19 and 20 of the container 11 (see FIG. 2), but not joining the bottom 21 of the container 11 (FIG. 1) to provide a settled sewage or sludge return thereunder, to and for the purposes to be hereinafter more fully discussed.

The partition 18 may be separately inserted into the container 11, as by tongue and groove, butt joint or other connection (not shown).

To facilitate the return of the settled solids from the settling tank 14 to the bottom of the reducing tank 13 under the partition 18, the end wall 24 of the container 11 preferably has a portion 25 fabricated at an angle, as illustrated in FIG. 1. Finally, a cover 22 is provided for container 11 to enclose, but provide necessary access to, the three tanks, as shown in FIG. 1. The various walls, partitions and cover of the system may conveniently be formed of cement, as shown, or of a metal, such as steel, or the like, the primary consideration being, of course, the ability to resist attack by the elements (fluids and solids) contained therein.

A sewage input pipe or tile 28 is provided in the wall 29 of the container 11 at a level just above the surface level of the fluid within the input settling tank 12, whereby sewage flows into the settling tank 12 as indicated by the arrow at the left of FIG. 1. Within the tank 12, the sewage divides or separates naturally into a light floating component and foam, and a heavy settling or sinking component, leaving the center of the fluid relatively, but not completely, clear.

It should be pointed out that the input settling tank 12 is illustrated herein to demonstrate an initial sewage clarification technique and apparatus; however, in some applications, the input sewage may be directed initially into the reduction tank 13, described below in detail.

A pipe 30 is provided to conduct fluid from an intermediate depth of the tank 12 into the reducing or treatment tank 13, as indicated by the arrow to the right of tank 12 in FIG. 1, through a hole 31 cast or otherwise formed in the separating wall 17.

Within the reducing tank 13, an aerator pipe 33 is provided near the bottom of the tank. The aerator pipe 33 may be connected to an air pump, carried, perhaps, on the cover 22, and may be of "T" shape to uniformly distribute air into the fluid. The air which is released into the reducing tank 13 rises in the fluid contained within the tank thereby contacting the sewage to aid in chemical and biological reduction and/or oxidation to ash and other nondeleterious substances, in accordance with well-known principles. The rising air also establishes a current or flow within the fluid in tank 13, as shown by the circulation-indicating arrows within the said tank in FIG. 1. Again, both floating and heavy solids settle in the reducing tank 13, ideally in lesser amounts than in the input settling tank 12.

From the reducing tank 13, the fluid is transferred under the partition 18 to the final or outflow settling tank 14. By the time the fluid reaches tank 14, most of the floating (light) and settling (heavy) solids have been removed; however, a small portion of each is present in the tank 14. To further eliminate these components, the heavier solids settle onto the angled portion 25 of the end wall 24 and are directed thereby and through the action and effect of gravity back into the reducing tank 13.

The floating solids on the other hand are returned via return pipe line or tube 37 through a hole 38 in the partition 18. The pipe 37 is disposed at a level such that the fluid partially fills the pipe along its horizontal axis when the tanks are filled to their normal level. Further, pipe 37 is configured in a "J" or other shaped pattern so that the opening or outlet 39 in tank 13 of the pipe 37 opens in the same direction as the direction of flow of the current established by the aerating device discussed above. Thus, the fluid in the reducing tank 13 sweeps by the opening 39 and, thereby, draws the fluid therewithin and the fluid at and near the surface within the settling tank 14 back into the reducing tank 13. Thus, the floating matter within the settling tank 14 is effectively returned or educted to the reducing tank 13 to be further treated and reduced to a non-noxious form. Note, if the current in tank 13 were a lateral instead of a fore and aft current, the opening 39 would open laterally. Likewise, if the current were counter-clockwise, instead of clockwise as viewed in FIG. 1, the opening 39 would face toward tank 12.

Because the aerator within the reducing tank 13 is ordinarily not continuously operated, however, the current and its induced drawing force are not always available to educt the floating matter from the settling tank 14. Since pipe 37, as dscribed above, provides communication between the fluid surfaces of tanks 13 and 14, solids will flow on the surface from tank 13 to tank 14 when the air is off and the only action or current is due to natural causes and effects occurring in the tanks, respectively. To prevent this flow of floating solids from the tank 13 to the tank 14, a cover 40 is provided over the opening 39 of the return pipe 37. The cover 40 is hingedly supported on the top of pipe 37 by means such as hinge 41 so that the current of the fluid within the reducing tank will bear upon the cover and cause it to open when the air is flowing into tank 13, but gravity will cause the cover to close when the current is not flowing to prevent the surface fluid and entrapped floating solids in reducing tank 13 from flowing into tank 14.

Finally, an effluent or outflow pipe 44 is provided to conduct the purified and clarified effluent from an intermediate depth of the fluid in the settling tank 14 to a discharge pipe or tile 45 through a hole 46 in the wall 24.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:
1. A sewage treatment system, comprising:
a first settling tank having an input for receiving sewage;
a reducing tank;
means for conducting fluid from an intermediate depth of said first settling tank into said reducing tank;
a second settling tank having an output for discharging fluid, said second settling tank being adjacent said reducing tank and having a wall in common therewith around which fluid in said reducing tank and said second settling tank is free to flow;
means for conducting and releasing air within the fluid in said reducing tank whereby a fluid current flow is generated within said reducing tank at the surface thereof;
a surface fluid return between said second settling tank and said reducing tank, said surface fluid return having an opening disposed to enable said current at the surface of said reducing tank to draw fluid from said second settling tank through said fluid return into said reducing tank; and
means normally closing said opening in said reducing tank in the absence of said current flow and responsive to said current flow to open said opening.

2. The sewage treatment system according to claim 1 wherein said surface fluid return is a pipe communicating with said reducing tank and with said second settling tank and being partially submerged in the fluid therewithin, said opening in said reducing tank faces toward the direction in and toward which said surface current flows, whereby said current flow draws the fluid from within said pipe and the surface fluid within said second settling tank into said reducing tank.

3. The sewage treatment system according to claim 2 wherein said means for closing and opening said return pipe is a plate hingedly carried upon said pipe, said plate being moved by the surface current to open the opening of said pipe, and covering the opening of said pipe in the absence of current flow to prevent fluid from entering thereinto from said reducing tank.

4. A sewage treatment system comprising a tank having inlet and outlet means, a partition dividing said tank into first and second portions and extending to near the bottom of said tank, said inlet means communicating with said first portion of said tank and said outlet means leading from said second portion of said tank, means in said first portion of said tank for inducing air into a fluid therein and thereby establishing a current flow in a fluid therein; fluid return means communicating between said first and second portions of said tank, and control means automatically opening and closing said fluid return means in a predetermined cycle, said control means opening said fluid return means to permit fluid flow from said second portion to said first portion of said tank when said air is being induced into said first portion of said tank, and closing said fluid return means to prevent fluid flow between said first and second portions of said tank when said current flow is abated in said first portion of said tank, said current flow inducing flow of fluid in said fluid return means from said second portion of said tank to said first portion of said tank, when said control means has opened said fluid return means.

5. The sewage treatment system according to claim 4 wherein said control means is opened by said current flowing in said first portion of said tank.

6. The sewage treatment system according to claim 5 wherein said fluid return means is disposed to enable said current flowing in said first portion of said tank to draw fluid from said second portion through said return means into said first portion of said tank.

7. The sewage treatment system according to claim 6 wherein said return means is a pipe disposed to be partially submerged in the fluid in said tank and having an opening facing toward the direction in and toward which said current flow flows adjacent said opening and said control means controls said opening.

8. The sewage treatment system according to claim 7 wherein said control means is a plate hingedly mounted on said pipe for covering said opening thereof, said plate being opened by said current flow.

9. The sewage treatment system according to claim 8 wherein said means for establishing a current is a means for releasing air within the fluid within said first portion of said tank.

10. The sewage treatment system according to claim 9 wherein said fluid return pipe is of generally "J" shape with the short leg of the "J" having said opening.

11. A surface fluid return for use between first and second fluid-containing tanks of a sewage treatment system, comprising,
a pipe communicating with said first and second tanks, respectively, and being partially submerged in the fluid therein, and
means closing an opening in said pipe in said first tank, said last named means being responsive to a current flowing in in said first tank adjacent and in a direction in which said opening faces to open said opening, whereby fluid in said second tank is drawn through said pipe into said first tank.

12. The surface fluid return of claim 11 wherein said last-named means for closing said pipe comprises a cover hingedly carried by said pipe and preventing fluid flow from said first to said second tank when closed, said covering being acted upon by a current flow within said first tank to open and permit eduction of fluid by said fluid flow through said pipe.

* * * * *